United States Patent [19]
Lia et al.

[11] Patent Number: 4,913,369
[45] Date of Patent: Apr. 3, 1990

[54] REEL FOR BORESCOPE INSERTION TUBE

[75] Inventors: Raymond A. Lia, Auburn; Alan S. Knieriem; Timothy K. Wilson, both of Syracuse, all of N.Y.

[73] Assignee: Welch Allyn, Inc., Skaneateles Falls, N.Y.

[21] Appl. No.: 360,857

[22] Filed: Jun. 2, 1989

[51] Int. Cl.⁴ .................. B65H 75/40; B65H 49/00
[52] U.S. Cl. ................................. 242/96; 242/129
[58] Field of Search ............... 242/96, 100, 129, 1, 242/118.41; 206/408, 303, 389

[56] References Cited

U.S. PATENT DOCUMENTS

| | | | |
|---|---|---|---|
| 2,954,942 | 10/1960 | Raus | 242/100 |
| 3,279,590 | 10/1966 | Gould et al. | 242/129 |
| 4,082,235 | 4/1978 | Dauvergne | 242/96 X |
| 4,256,225 | 3/1981 | Jackson | 206/303 |
| 4,410,084 | 10/1983 | Ladner | 206/408 X |
| 4,692,034 | 9/1987 | Fukui et al. | 242/96 X |
| 4,702,035 | 10/1987 | Palm | 242/96 X |

Primary Examiner—Stuart S. Levy
Assistant Examiner—Eric P. Dunlap
Attorney, Agent, or Firm—Wall and Roehrig

[57] ABSTRACT

A storage and dispensing reel for borescope insertion tubes which has a reel compartment for the coiled tube and an inner foam filled storage compartment for the proximal end of the tube and the associated control modules therefore. The entire reel is arranged for rotation about its axis and has a cover to secure and protect the apparatus stored therein.

8 Claims, 1 Drawing Sheet

REEL FOR BORESCOPE INSERTION TUBE

BACKGROUND OF THE INVENTION

This invention relates to a reel for storing an elongated insertion tube for a borescope in a protected, yet readily available condition for easy coiling and uncoiling.

As insertion tubes for borescopes became longer and longer with improved image sensor technology, it became common practice to coil the insertion tube around a standard reel or spool for ease in handling and transporting of the insertion tube and its associated controls along with the rest of the borescope apparatus. Since there is usually connected at the input end of the insertion tube an interface module that connects with the video processor of the borescope system, a steering control for controlling the articulated distal end of the insertion tube and valve controls for controlling passage of air, water, etc. to the distal end of the tube, the standard reel or spool proved to be of very limited utility. It soon became obvious that these components would not stay in place on the normal reel and had to be restrained or otherwise packaged to prevent damage in the normal use of the device in the field. Also, as the borescope insertion tubes became longer and longer, the likelihood of getting the tube tangled up with itself and these termination devices increased, and considerable time and expense were expended in coping with these deficiencies.

OBJECTS AND SUMMARY OF THE INVENTION

Accordingly, it is an object of the present invention to provide a protective storage and dispensing device for elongated insertion tubes for borescopes and the like.

It is another object of the present invention to provide a reel for storing both the insertion tube and the interface module and steering controls of the usual borescope insertion tubes in a safe and protected manner.

It is yet another object of the present invention t provide a reel for storing elongated insertion tubes for borescopes that can be easily and simply operated to dispense the extended length of the insertion tube while protecting the interface module and steering control modules of the usual borescope.

It is a further object of the present invention to provide a combination storage and dispensing reel assembly for elongated borescope insertion tubes that can be easily and simply transported from place to place while holding the insertion tube and its control accessories in a secure and protected fashion.

It is a still further object of the present invention to provide a storage and dispensing reel for borescope insertion tubes that facilitates the connection of the insertion tube to the display and control apparatus of the borescope, and permits the easy and unfettered feeding of the insertion tube into the device to be inspected.

BRIEF DESCRIPTION OF THE DRAWING

These and other and further objects of the present invention, together with additional features and advantages accruing therefrom will be apparent from the following description of a preferred embodiment, which is shown in the accompanying drawings wherein.

DETAILED DESCRIPTION OF A PREFERRED EMBODIMENT

Figure 1:
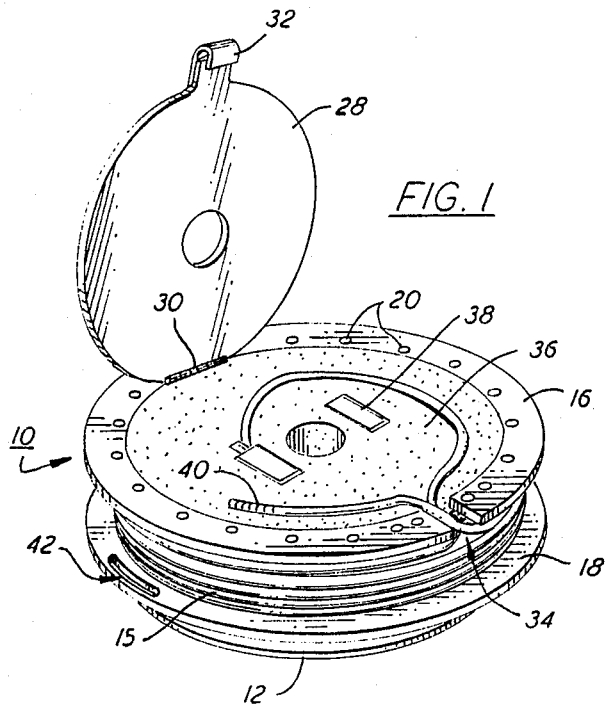
FIG. 1 is a perspective view of a reel, storage and dispensing assembly in accordance with the present invention.
Figure 4:
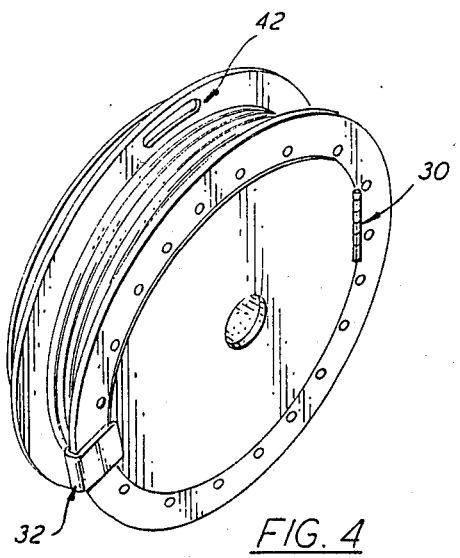
FIG. 4 is a perspective view in closed position, showing the combination storage and dispensing device in its carrying case configuration.

Referring now to FIG. 1, there is shown in perspective a storage and dispensing reel 10 in accordance with the present invention. The reel 10 is rotatably mounted on a base 12 on suitable bearing members 14 positioned to allow the reel to turn freely as the insertion tube 15 stored thereon is uncoiled. The reel is a flanged reel having upper and lower flanges at 16 and 18 spaced apart by standoff members 20 disposed around the circumference of the reel portion. The standoffs are disposed on a diameter sufficient to allow coiling of the borescope insertion tube 15 without damaging any of the elements within the tube. A cylindrical layer 26 of semi-rigid plastic or similar material such as foam about 3/32 inch thick, is disposed about the circumference of the circle defined by said standoffs 20 to form a surface support for the insertion tube when coiled on the reel. The durometer density and thickness of the foam are chosen to bridge the space between standoffs and support the coiled insertion tube. In the embodiment shown, the standoffs are about four inches long and spaced apart about six inches around the circumference of the core of the reel. The flanges 16 and 18 extend outwardly sufficiently to allow several layers of the insertion tube to be coiled therearound depending upon the length of the insertion tube to be stored thereon. In the embodiment shown this is about three inches.

The upper side of the reel has a door member 28 hinged at 30 with a latch 32 adapted to secure the door in a closed position at the access notch or gap 34 in the edge of the upper flange of the reel. Disposed within the circle formed by the standoffs is a central cylindrical block of foam 36 with one or more storage compartments 38 formed therein to accommodate the interface module, and other auxiliary apparatus connected to the proximal end of the insertion tube.

In operation, the proximal end of the insertion tube is placed in the reel with the interface module 60 in its pocket 38 and then the reel is rotated with the insertion tube extending out through the access gap 34 until the insertion tube is fully wound around the outer circumference of the reel on foam 26 within the flanges and only a short length of the distal end remains. The distal end 40 is then brought back through the gap 34 and coiled around on the inside of the compartment until it is in a protected position within the compartment. The door is then closed and latched and the entire assembly can then be picked up by handle 42 and easily carried along with the rest of the apparatus of the borescope to the particular site of operation. Handle 42 is shown as a hand hole cut in flange 18. Additional hand holes 42 disposed about the periphery of flanges 16 and 18 may be provided if desired.

In use, the cover is opened, the distal end of the tube withdrawn, and the reel uncoiled as the insertion tube is inserted into the structure to be inspected. After the desired amount of insertion tube has been withdrawn, the interface module and other auxiliary apparatus can be taken out of the foam blocks and attached to the video display terminal and other control elements of the borescope. If all the insertion tube is not needed for the device to be inspected, the balance can be left in the coiled condition around the reel and the cover closed to secure it in the configuration suitable for operation.

As can be seen from the foregoing, the plastic ring 26 positioned directly around the standoffs support the insertion tube itself and the cylindrical foam block within the compartment provides secure nests or cavities for the particular control components at the proximal end of the insertion tube. With the reel rotatably mounted on the fixed base, the insertion tube can be simply and easily unwound or wound up again after us of the device. The insertion tube and its associated controls is therefore protected as much as possible throughout its use both in operation and in storage and transportation.

Figure 6:
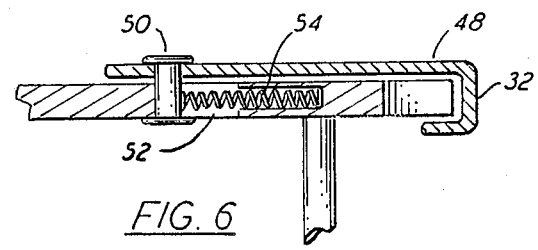
FIGS. 5 and 6 are detailed views of a latch mechanism for securely holding the cover in place during storage and transportation.
Figure 5:
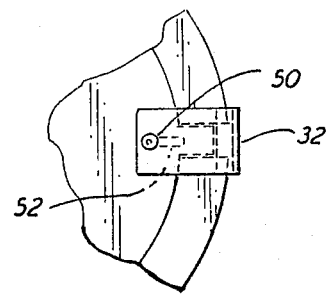
Figure 2:
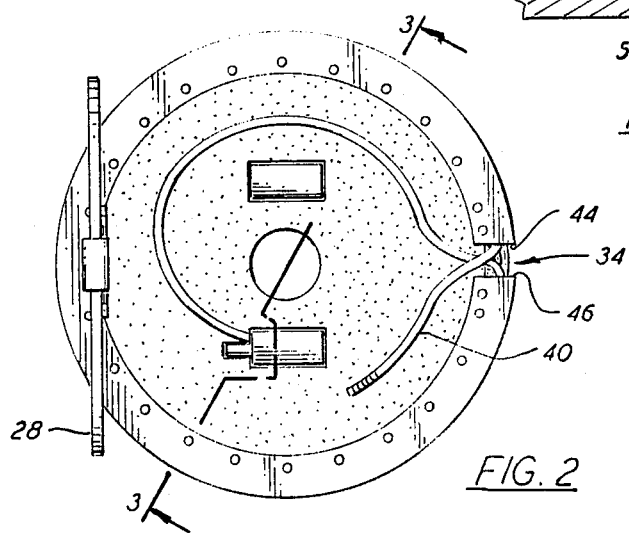
FIG. 2 is a top plan view with the protective door in the open position showing the storage section for the interface module and the steering control module and the like with the borescope insertion tube coiled around the outside thereof.
Figure 3:
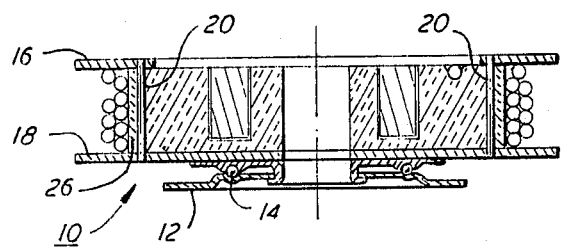
FIG. 3 is a sectional view on line 3—3 of FIG. 2 showing the details of construction of the reel assembly.

Referring now to FIGS. 5 and 6, there is shown in detail the construction of the latch mechanism 32. Since the upper flange 16 of the reel has a notch or gap 34 cut therein to allow easy withdrawal of the control modules and attached insertion tube, the latch mechanism has to be specially designed to help contain the outer perimeter of the upper flange. The ordinary spring urged latch mechanism pushing on the ends 44 and 46 of notch 34 would tend to cause the upper flange members to be forced apart and break, which would seriously lessen the utility of the construction shown.

Accordingly, the latch comprises a channel 48 that actually wraps around the outer edges of the upper flange adjacent each end of the gap and is spring urged inwardly to provide the necessary retaining function while making it very easy to open when desired. As may be seen, the J-shaped metal closure 48 is fastened to pin 50 which extends through slot 52 and is spring urged inwardly by spring 54. This moves closure 48 inwardly to clamp about the outer edges of the two end portions 44 and 46 of the upper flange gap.

While this invention has been explained with reference to the structure disclosed herein, it is not confined to the details as set forth and this application is intended to cover any modifications and changes as may come within the scope of the following claims.

What is claimed is:

1. A borescope insertion tube storage and dispensing device comprising:
   a base member;
   a reel member rotatably mounted on said base, said real member consisting of upper and lower spaced apart flange members mounted on a plurality of standoffs defining an outer recess therebetween adapted to receive the insertion tube in coiled fashion and an inner cylindrical compartment;
   a circular cover portion cut from the upper flange member and hingedly mounted therein providing, when in the open position, across to said inner cylindrical compartment within the center of said reel;
   a cylindrical block of resilient foam material disposed within said inner compartment, having a plurality of cavities adapted to receive therein an interface module of a borescope insertion tube; and
   handle means positioned adjacent the periphery of one of said flange members for carrying the storage and dispensing device.

2. A device as described in claim 1 further defined by a layer of semi-rigid foam material wrapped about said standoffs to form a support hub about which an insertion tube may be coiled.

3. A device as described in claim 2 further defined by the upper flange of said pair of flange members having an access notch therein; and a latch mechanism mounted on said cover adapted to engage the outer edges of said upper flange on either side of said access notch to hold the cover closed.

4. A device as described in claim 2 wherein said upper flange member has cut therein an access notch so that the insertion tube may be led into the interior of said reel member from between said flanges.

5. A device as described in claim 2 wherein said lower flange member and said upper flange member have a central hole therein to form an axis about which said reel member may be rotated.

6. A device as described in claim 2 wherein at least one of said flange members has formed therein at least one hand hole adjacent the edge thereof.

7. Apparatus for storing and dispensing a borescope insertion tube having a distal end and a proximal end to which an interface module is attached, said apparatus including
   a reel member having upper and lower spaced apart flange members mounted upon a plurality of standoffs which define an inner cylindrical compartment for storing the distal and proximal ends of an insertion tube and an outer recess, one of said flanges having an opening to said compartment formed therein,
   a layer of material encircling the standoffs to form a hub about which said insertion tube is coiled,
   a cylindrical block mounted within the compartment having a cavity passing downwardly into the block through a top surface of said block which faces the opening, the interface module of said insertion tube being stored within said cavity,
   a cover means hingedly mounted on said one flange member for closing said opening and holding the distal and proximal ends of the insertion tube in a stored condition within said compartment, and
   means to rotate the reel member about its central axis to coil and dispense said insertion tube.

8. The apparatus of claim 7 that further includes a handle means for carrying said reel member.

* * * * *

UNITED STATES PATENT AND TRADEMARK OFFICE
CERTIFICATE OF CORRECTION

PATENT NO. : 4,913,369
DATED : April 3, 1990
INVENTOR(S) : RAYMOND A. LIA et al.

It is certified that error appears in the above—identified patent and that said Letters Patent is hereby corrected as shown below:

Col. 4, line 5, please change "across" to --access--.

Signed and Sealed this

Tenth Day of March, 1992

Attest:

HARRY F. MANBECK, JR.

*Attesting Officer*  *Commissioner of Patents and Trademarks*